US010055031B2

(12) United States Patent
Park et al.

(10) Patent No.: US 10,055,031 B2
(45) Date of Patent: *Aug. 21, 2018

(54) INPUT DEVICE FOR FOLDABLE DISPLAY DEVICE AND INPUT METHOD THEREOF (71) Applicant: Samsung Electronics Co., Ltd., Suwon-si (KR)

(72) Inventors: Yong Gook Park, Yongin-si (KR); Hyun Jin Kim, Gwangju (KR); Min Kyu Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

This patent is subject to a terminal disclaimer.

(21) Appl. No.: 14/048,465

(22) Filed: Oct. 8, 2013

(65) Prior Publication Data
US 2014/0035872 A1 Feb. 6, 2014

Related U.S. Application Data (63) Continuation of application No. 12/604,962, filed on Oct. 23, 2009, now Pat. No. 8,564,551.

(30) Foreign Application Priority Data

Oct. 24, 2008 (KR) .......................... 10-2008-0104641

(51) Int. Cl.
G06F 3/041 (2006.01)
G06F 3/0354 (2013.01)
G06F 3/043 (2006.01)

(52) U.S. Cl.
CPC ........ *G06F 3/03545* (2013.01); *G06F 3/0412* (2013.01); *G06F 3/0414* (2013.01); *G06F 3/0433* (2013.01)

(58) Field of Classification Search
CPC .................................. G06F 3/041; G06F 3/033
(Continued)

(56) References Cited

U.S. PATENT DOCUMENTS 6,411,285 B1 * 6/2002 Miyazawa ..................... 345/173
9,804,717 B2 * 10/2017 Schropp, Jr. ............ G06F 3/044
(Continued)

FOREIGN PATENT DOCUMENTS

JP 2004-246904 9/2004
KR 10-0334589 4/2002

OTHER PUBLICATIONS

Non-Final Office Action dated May 3, 2012 in U.S. Appl. No. 12/604,962.
(Continued)

*Primary Examiner* — William Boddie
*Assistant Examiner* — Bipin Gyawali
(74) *Attorney, Agent, or Firm* — H.C. Park & Associates, PLC (57) ABSTRACT An input apparatus including an electronic pen and a terminal having a foldable display unit is provided. An electronic pen generates an ultrasonic signal and an infrared signal. A terminal detects the ultrasonic signal and the infrared signal and calculates coordinate information of the electronic pen based on the received ultrasonic signal and the infrared signal. The terminal determines coordinate information of the electronic pen with respect to the foldable display unit by measuring a folding angle of the foldable display unit.

16 Claims, 6 Drawing Sheets (58) Field of Classification Search
USPC .................................. 345/156–157, 173–179
See application file for complete search history.

(56) References Cited

U.S. PATENT DOCUMENTS

| 9,891,670 B2* | 2/2018 | Kim ...................... G06F 1/1652 |
| 2004/0032399 A1 | 2/2004 | Sekiguchi et al. |
| 2004/0201580 A1 | 10/2004 | Fujiwara et al. |
| 2006/0189385 A1* | 8/2006 | Nakajima ............... A63F 13/10 |
| | | 463/37 |
| 2006/0267959 A1 | 11/2006 | Goto et al. |
| 2007/0247422 A1* | 10/2007 | Vertegaal et al. ............ 345/156 |

OTHER PUBLICATIONS

Final Office Action dated Oct. 23, 2012 in U.S. Appl. No. 12/604,962.
Notice of Allowance dated Jun. 21, 2013 in U.S. Appl. No. 12/604,962.
Decision to Grant Patent dated Apr. 30, 2015, in Korean Patent Application No. 10-2008-0104641.

* cited by examiner

INPUT DEVICE FOR FOLDABLE DISPLAY DEVICE AND INPUT METHOD THEREOF

CROSS REFERENCE TO RELATED APPLICATIONS

This application is a continuation of U.S. patent application Ser. No. 12/604,962, filed on Oct. 23, 2009, and claims priority from and the benefit of Korean Patent Application No. 10-2008-0104641, filed on Oct. 24, 2008, all of which are hereby incorporated by reference for all purposes as if fully set forth herein.

BACKGROUND OF THE INVENTION

Field of the Invention

Exemplary embodiments of the present invention relate to an input apparatus and an input method. In particular, exemplary embodiments of the present invention relate to a terminal having a display unit and an input method of the terminal.

Description of the Background

Recently, portable terminals have become widely used because of their mobility. Portable terminals may execute a file reproducing function such as an MP3 play function, or an image capturing function to acquire photos similar to a digital camera. A portable terminal can also support a platform for a mobile game or an arcade game.

To efficiently support various functions, a portable terminal may include a display unit. However, a size of the display unit may be limited due to portability and spatial limitations. Accordingly, a foldable display can be used as a display unit to overcome spatial limitations.

While a portable terminal having the foldable display unit has a mechanical structure similar to a folder, the terminal can support continuous display of an image by performing appropriate processing on a hinge area of a screen on the display unit to prevent interruption or blurring of the display of an image when the display unit is folded at a given angle. When the terminal having the foldable display unit employs a keypad, it becomes difficult to realize a portable, miniaturized terminal due to the need for additional space for the keypad. When the terminal having the foldable display unit utilizes a touch screen, a touch can be erroneously detected on the screen, or a problem may occur after repeated opening and closing of the display unit because the tensile strength of the touch screen is not secure enough or is less than the tensile strength of the display unit.

SUMMARY OF THE INVENTION

Exemplary embodiments of the present invention provide an input apparatus and an input method of the input apparatus having a terminal with a foldable display unit to avoid a display error.

Additional features of the invention will be set forth in the description which follows, and in part will be apparent from the description, or may be learned by practice of the invention.

Exemplary embodiments of the present invention disclose an apparatus an electronic pen and a terminal. The electronic pen is configured to generate an ultrasonic signal and an infrared signal. The terminal includes a foldable display unit and is configured to detect the ultrasonic signal and the infrared signal. The terminal is configured to determine coordinate information of the electronic pen based on the ultrasonic signal, the infrared signal, a folding angle of the foldable display unit.

Exemplary embodiments of the present invention disclose an input method of an apparatus including an electronic pen and a terminal having a foldable display unit. The input method includes determining a first distance between a first ultrasonic sensor unit of the terminal and the electronic pen in response to the first ultrasonic sensor unit detecting an ultrasonic signal generated by the electronic pen, determining a second distance between a second ultrasonic sensor unit of the terminal and the electronic pen in response to the second ultrasonic sensor unit detecting the ultrasonic signal. The input method further includes detecting a third distance between an infrared sensor unit of the terminal and the electronic pen in response to the infrared sensor unit detecting an infrared signal generated by the electronic pen, and calculating a fifth distance. The fifth distance is a shortest distance between the electronic pen and a first side of the display unit. The first ultrasonic sensor, the second ultrasonic sensor, and the infrared sensor are situated on the first side. The fifth distance is calculated using the first distance, the second distance, the third distance, and a fourth distance between the first ultrasonic sensor and the second ultrasonic sensor. The input method further includes determining a folding angle of the foldable display unit, and calculating coordinate information on the display unit of the electronic pen by using the folding angle, the fifth distance, and a straight distance between an edge of the first side and a point where the display unit is folded. Exemplary embodiments of the present invention disclose an apparatus including an electronic pen and a terminal. The electronic pen is configured to generate at least one signal. The terminal includes a foldable display unit. The terminal is configured to detect the at least one signal and determine coordinate information of the electronic pen based on the at least one signal and a folding angle of the foldable display unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention are described below in detail with reference to the drawings.

Figure 1:
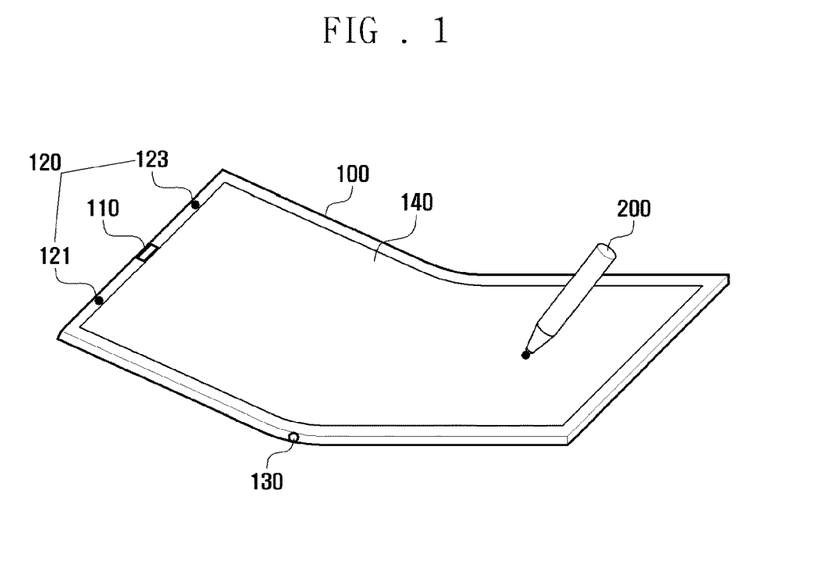
FIG. 1 is a schematic view illustrating an input system of a terminal having a foldable display unit according to exemplary embodiments of the present invention.

FIG. 1 is a schematic view illustrating an input apparatus of a terminal having a foldable display unit according to exemplary embodiments of the present invention.

Referring to FIG. 1, the input apparatus according to exemplary embodiments of the present invention may include a terminal 100 and an electronic pen 200. The terminal 100 may include a controller 160, a storage unit 150, a display unit 140, an angle sensor unit 130, an ultrasonic sensor unit 120, and an infrared sensor unit 110. A sensor receiver may be disposed on the terminal 100 to receive a sensor signal generated by the electronic pen 200. A coordinate of a point which the electronic pen 200 selects may be determined based on the received sensor signal. The determined coordinate may be matched to a pre-defined display map to perform a corresponding function. The terminal 100 may determine a folding angle of the display unit 140 by using the angle sensor unit 130. The calculated angle may be used to determine the coordinate. An error in determining the coordinate of the electronic pen 200 may be avoided by using the folding angle.

The terminal 100 may detect signals (e.g., an ultrasonic signal and an infrared signal) from the electronic pen 200 using the ultrasonic sensor unit 120 and the infrared sensor unit 110. The terminal 100 may detect a folding angle of the foldable display unit 140 using the angle sensor unit 130. The terminal 100 may detect a distance between the electronic pen 200 and the respective sensor units 110, 120, and 130 by using the detected ultrasonic signal and the infrared signal. The coordinate of the electronic pen 200 can then be calculated using the detected angle. The terminal 100 may activate a function of a display map that matches the calculated coordinate. The display map may be displayed on the display unit 140 and can be, for example, a key map, a menu map, or a link map. If the coordinate of the electronic pen 200 is not within a predefined range (e.g., the electronic pen 200 generates a signal outside the foldable display unit 140), the terminal 100 may ignore a signal transmitted by the electronic pen 200 and may not perform a function of the terminal 100 in response to the transmitted signal. The configuration of the terminal 100 of the present invention is described in detail below with reference to FIG. 3 and FIG. 4.

In general, the electronic pen 200 may have any suitable shape. For example, the electronic pen 200 may have a conical shape and a sharp, pointed end to select a specific point on the display unit 140. In some cases, to enhance a user's convenience in gripping the electronic pen 200, the body of the electronic pen 200 can be formed in a cylindrical shape. In some cases, the electronic pen 200 can be formed in a polygon shape to avoid unwanted rolling of the electronic pen 200. The electronic pen 200 may have a pressure sensor at an end point (e.g., sharp, pointed end) of the electronic pen 200 in order to generate a signal indicating that a contact is made by the electronic pen 200 at a certain point on the display unit 140. When the electronic pen 200 contacts the certain point on the display unit 140, an ultrasonic signal and an infrared signal may be generated and transmitted to the ultrasonic sensor unit 120 and the infrared sensor unit 110 of the terminal 100. The configuration of the electronic pen 200 is described below in detail with reference to FIG. 2.

Figure 2:
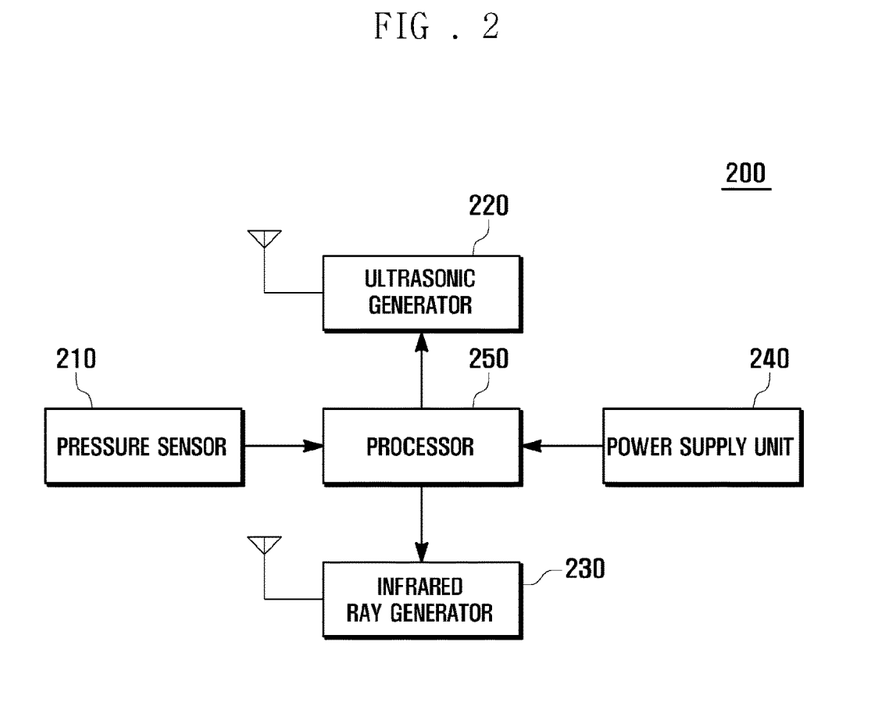
FIG. 2 is a block diagram illustrating the electronic pen of FIG. 1 according to exemplary embodiments of the present invention.

FIG. 2 is a block diagram illustrating the electronic pen 200 according to exemplary embodiments of the present invention.

Referring to FIG. 2, the electronic pen 200 may include a pressure sensor 210, an ultrasonic generator 220, an infrared ray generator 230, a power supply unit 240, and a processor 250.

The pressure sensor 210 may be situated in one end portion of the electronic pen 200. When the end portion of the electronic pen 200 contacts an object, the pressure sensor 210 may sense the pressure between the electronic pen 200 and the terminal 100, and may generate and transmit a signal to the processor 250. The pressure sensor 210 can have a resilient, compressible structure so that the pressure sensor 210 is pressed down by a given depth when pressure is applied thereto as the user contacts a specific point on the terminal 100 by using the electronic pen 200. The pressure sensor 210 may return to the original state when pressure applied to the electronic pen 200 is removed. The pressure sensor 210 may be formed, in some cases, in a ball-shape because the pressure sensor 210 may be positioned at the end portion of the electronic pen 200. Accordingly, the pressure sensor 210 may be exposed to abrasion or scratching, and may have a resilient contact structure. It should however be noted that the pressure sensor 210 can be formed in various ways. For example, the pressure sensor 210 can have an electrical property that changes when a contact is made between the pressure sensor 210 and another object.

The ultrasonic generator 220 may generate an ultrasonic wave (e.g., ultrasonic signal) under the control of the processor 250. The ultrasonic generator 220 can be embodied as a chip and may be mounted inside the electronic pen 200.

The infrared ray generator 230 may generate an infrared ray (e.g., infrared signal) under the control of the processor 250. The infrared ray generator 230 can be embodied as a chip and may be mounted inside the electronic pen 200.

The power supply unit 240 can supply power to the processor 250, the ultrasonic generator 220, the infrared ray generator 230, and the pressure sensor 210. The power supply unit 240 can be a chargeable secondary battery. The power supply unit 240 may also be a primary battery such as, for example, a mercury battery, a dry cell battery, or an alkaline battery. The power supply unit 240 can be placed inside the body part of the electronic pen 200. When placing the power supply unit 240 inside the electronic pen 200, a cap can be used to fasten the power supply unit 240. That is, the electronic pen 200 can have a power supply unit 240 mounted inside the electronic pen 200 and a cap to cover the power supply unit 240. The cap may be used to fasten the power supply unit 240 and form an electrical signal path.

The processor 250 may control distribution of the power of the power supply unit 240 to the pressure sensor 210, the ultrasonic generator 220, and the infrared ray generator 230. The processor 250 may also instruct the ultrasonic generator 220 and the infrared ray generator 230 to generate a corresponding signal in response to an input signal generated by the pressure sensor 210.

In some cases, the ultrasonic generator 220 and the infrared ray generator 230 may be separated from the pressure sensor 210 by a given distance. However, in some cases, the ultrasonic generator 220 and the infrared ray generator 230 may be situated near the pressure sensor 210. If the ultrasonic generator 220 and the infrared ray generator 230 are spaced apart from the pressure sensor 210 by a significant distance and the electronic pen 200 touches and selects a given point on the display unit 140, an error can occur in determining the location at which the electronic pen 200 is pointing due to the difference in distance (i.e., difference between the distance from the pressure sensor 210 to the ultrasonic generator 220 and the distance from the pressure sensor 210 to the infrared ray generator 230). Accordingly, the respective distances between the pressure sensor 210 and the ultrasonic generator 220, and the pressure sensor 210 and the infrared ray generator 230 may be within a certain distance range.

Hereinafter, a configuration of the terminal 100 according to exemplary embodiments of the present invention is described in detail with reference to FIG. 3.

Figure 3:
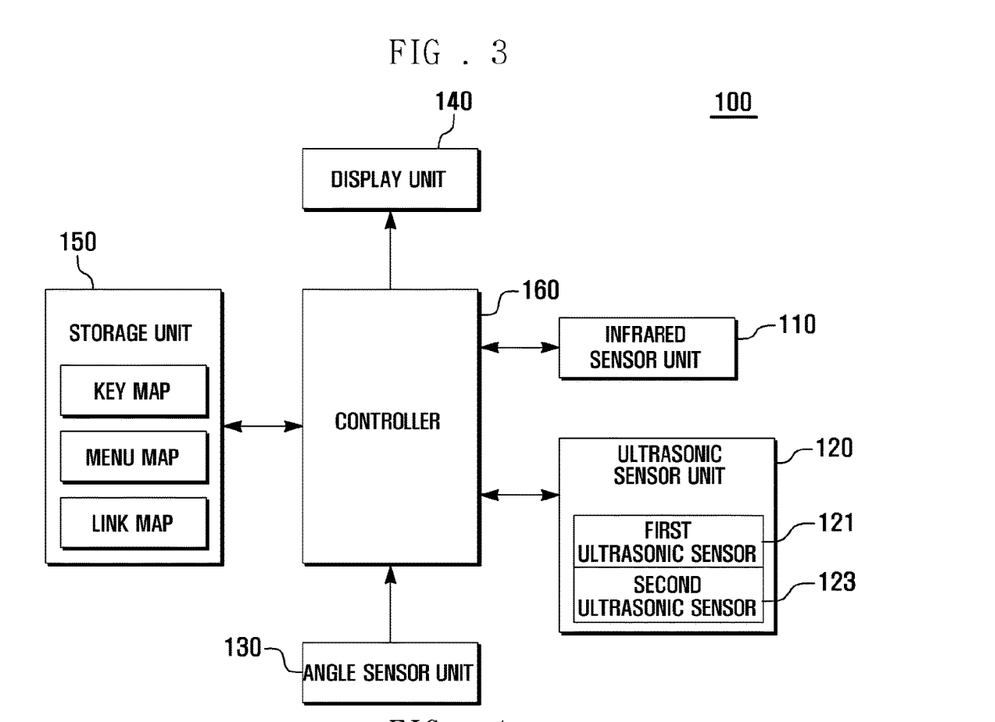
FIG. 3 is a block diagram illustrating a schematic configuration of the terminal of FIG. 1 according to exemplary embodiments of the present invention.

Referring to FIG. 3, the terminal 100 may include the infrared sensor unit 110, the ultrasonic sensor unit 120, the angle sensor unit 130, the display unit 140, the storage unit 150, and the controller 160.

The infrared sensor unit 110 may detect an infrared signal generated by the electronic pen 200. The infrared sensor unit 110 may be a light detecting unit to detect light generated by the infrared ray generator 230 of the electronic pen 200. The infrared light may have a certain frequency. When the infrared light generated by the infrared ray generator 230 reaches an object and is reflected, the reflected light may be sensed by the infrared sensor unit 110 and may allow detection of the object and determination of the distance to the object. The infrared light may be radiation light having a wavelength of, for example, 0.75 µm to 1 mm, which is longer than a wavelength of visible red light in electromagnetic radiation. The infrared sensor unit 110 may detect the infrared signal generated by the infrared ray generator 230 of the electronic pen 200, may determine the distance from the infrared ray generator 230 to the electronic pen 200, and may transmit the determined distance value to the controller 160.

The ultrasonic sensor unit 120 may detect an ultrasonic signal generated by the electronic pen 200. The ultrasonic sensor unit 120 may detect an object and determine a distance to the object. The ultrasonic sensor unit 120 can measure ultrasonic signals having a range of wavelengths. For example, the ultrasonic signals may have a wavelength of about 30 cm to about 3 m, and, in some cases, up to about 10 m. The ultrasonic sensor unit 120 may detect an ultrasonic signal generated by the ultrasonic generator 220 and may calculate the distance from the ultrasonic generator 220 to the electronic pen 200 based on the detected ultrasonic wave. The ultrasonic sensor unit 120 may transmit to the controller 160 the calculated distance value (i.e., the distance to the calculated electronic pen 200). The ultrasonic sensor unit 120 may include a first ultrasonic sensor 121 and a second ultrasonic sensor 123 for determining the coordinate of the electronic pen 200 with respect to the display unit 140. The first ultrasonic sensor 121 and the second ultrasonic sensor 123 may be arranged such that the first ultrasonic sensor 121 and the second ultrasonic sensor 123 are separated from each other relative to the infrared sensor unit 110 by a given interval. Accordingly, when the ultrasonic generator 220 generates an ultrasonic wave, the first ultrasonic sensor 121 and the second ultrasonic sensor 123 may measure the distance to the electronic pen 200, respectively. The measured distance values may be transmitted to the controller 160.

The angle sensor unit 130 may be formed on a hinge area of the terminal 100 to calculate a folding angle of the display unit 140 and to transmit the calculated angle value to the controller 160. The angle sensor unit 130 can be implemented as a gyro sensor or a sensor that can detect the angle of inclination relative to the surface of the earth. The angle sensor unit 130 can be mechanically implemented. For example, the angle sensor unit 130 can be positioned on a hinge area of the display unit 140. The angle sensor unit 130 may have a groove, or may be formed in a concavo-convex shape or as a gear so that a temporal tacking may be possible for each unit of angle. Since the angle sensor unit 130 may be rotated according to the folding angle of the foldable display unit 140, angle measurement on the basis of an angular unit can be performed so that the folding angle at which the foldable display unit 140 is folded may be obtained.

The display unit 140 may output a screen associated with a specific function of the portable terminal 100. The specific function may be predetermined or may be activated by a touch of the electronic pen 200. For example, the display unit 140 can output a boot screen, a standby screen, a menu screen, and/or a program activation screen. The display unit 140 can be implemented as a flexible liquid crystal display (FLCD). In a FLCD, the display unit 140 may include, for example, an LCD controller, a memory for storing data, and an LCD unit. The display unit 140 can be partially or completely folded with respect to an area in which the angle sensor unit 130 is positioned. Additionally, the display unit 140 can display a display map stored in the storage unit 150. For example, the display map can be at least one of a key map, a menu map, and a link map.

The key map may be a map that stores information about the positions of numbers, characters, and symbol characters that are displayed on the foldable display unit 140. A key map can vary according to the functionality of the terminal 100. For example, if the terminal 100 utilizes a mobile communication function, the key map can be a 3*4 key map or a qwerty key map. If the terminal 100 utilizes an internet service function, the key map can be a keyboard key map.

The key map may be arranged where each number or each character is arranged into a grid format.

The menu map may be a map that stores information about positions of menus that represent various functions associated with the terminal 100 or submenus linked to respective parent menus (e.g., a tree-shaped menu). The menu map can be arranged in such a way that multiple menus are shown on one side of the display unit 140 as icons or a list of icons. When one of the icons or the list that represents respective menus is selected or pointed by the electronic pen 200, submenus of the selected or pointed menu can appear in a new window or in an overlay window over a current window where an initial parent menu was output.

The link map may be a map that stores links to other screens or other links. For example, when a text may be output to the display unit 140, other text or another link may be assigned to a specific word contained in the output text. The specific word may provide a link to another screen, document, or image when selected. Position information and branch-off information of words having an associated link may be stored in the link map.

The storage unit 150 can store application programs and map operating programs. The application programs may perform various functions of the terminal 100, may operate the sensor units 110 and 120, and may reproduce various files stored in the storage unit 150. The map operating program may control an output of a map needed for each application program. The storage unit 150 can perform a buffering function to temporarily store sensing information input from the infrared sensor unit 110 or the ultrasonic sensor unit 120. The storage unit 150 can include a program area and a data area.

The program area can store, for example, an operating system (OS) for booting the terminal 100, and an application program for reproducing various files such as an application program for supporting a call function. Examples of application programs include a web browser for connecting to an internet server, an MP3 application program for reproducing a sound, an image output application program for reproducing images such as a picture, and a video reproducing application program. The program area may store an application program for operating the ultrasonic sensor unit 120 and the infrared sensor unit 110, and an application program for operating the angle sensor unit 130. The program area can store an application program for calculating the coordinate value of the electronic pen 200 based on sensor values received from the sensor units 110 and 120.

The data area may store data that are generated by the terminal 100. The data area can store various aforementioned types of data such as a sound source file, a picture file, and/or a video file. The data area may include a display map for operating the electronic pen 200. The display map may include, for example, at least one of a key map, a menu map, and a link map.

The terminal 100 may also include a radio frequency unit (not shown) for supporting a call function. The terminal 100 may further include a communication module (not shown) for internet server connection. The radio frequency unit and the communication module can, under the control of the controller 160, form a communication channel with another portable terminal or a specific server.

Figure 4:
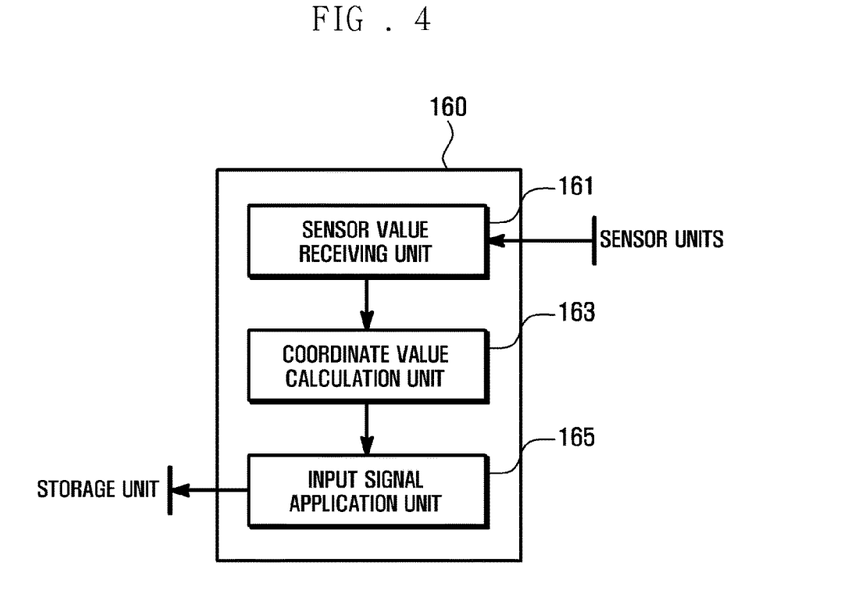
FIG. 4 is a block diagram illustrating the controller of FIG. 3 according to exemplary embodiments of the present invention.

The controller 160 may control the power supply of the terminal 100, the activation of each component of the terminal 100, and signal flow between each component of the terminal 100. The controller 160 may determine distances between the electronic pen 200 and respective sensor units (e.g., infrared sensor unit 110 and ultrasonic sensor unit 120) by using sensor values transmitted from the ultrasonic sensor unit 120 and the infrared sensor unit 110. In addition, the controller 160 may determine the coordinate value of the electronic pen 200 based on an angle value received from the angle sensor unit 130 and the calculated distance between the electronic pen 200 and the respective sensor units 110 and 120. The controller 160 may activate the terminal 100 in response to a user request and may instruct the display unit 140 to display a predefined display map (e.g., a key map, a menu map, and/or a link map). When the electronic pen 200 generates a sensor signal, the controller 160 may determine the coordinate value of the electronic pen 200. The controller 160 may perform mapping between the coordinate value of the electronic pen 200 and the display map to perform a function of the terminal associated with the coordinate value. The controller 160 may include a sensor value receiving unit 161, a coordinate value calculation unit 163, and an input signal application unit 165, as shown in FIG. 4, to perform the mapping.

The sensor value receiving unit 161 may receive each signal value transmitted from the ultrasonic sensor unit 120, the infrared sensor unit 110, and the angle sensor unit 130. The ultrasonic sensor unit 120 may include the first ultrasonic sensor 121 and the second ultrasonic sensor 123. Each of the first and second ultrasonic sensors 121 and 123 may transmit, to the sensor value receiving unit 161, the distance value to the electronic pen 200 based on the ultrasonic signal received from the electronic pen 200. The infrared sensor unit 110 can receive an infrared signal from the electronic pen 200 and may transmit, to the sensor value receiving unit 161, the distance value to the electronic pen 200 based on the received infrared signal. The angle sensor unit 130 may sense the folding angle of the display unit 140 and may transmit the sensed angle to the sensor value receiving unit 161. The sensor value receiving unit 161 may transmit the obtained distance values and angle value to the coordinate value calculation unit 163.

The coordinate value calculation unit 163 may receive sensing information from the sensor value receiving unit 161 and may determine the coordinate value of the electronic pen 200 by using the received sensing information. The method of determining the coordinate value of the electronic pen 200 by the coordinate value calculation unit 163 will be described in more detail below with reference to FIG. 5 and FIG. 6.

The input signal application unit 165 may determine that an input signal is generated in a location corresponding to the coordinate value calculated by the coordinate value calculation unit 163, and may activate a function associated with the display map output on the corresponding coordinate value. For example, if a key map is activated on the display unit 140 and the coordinate value designating a certain number or a specific character of the key map is calculated, the input signal application part 165 can instruct the display unit 140 to display the designated number or character. In addition, if a menu map is activated on the display unit 140 and the calculated coordinate value corresponds to a coordinate allocated for a specific menu, the input signal application unit 165 may activate a function of the specific menu. When a link map is activated on the display unit 140 and the calculated coordinate value corresponds to a word or an image having a specific link, the input signal application unit 165 may activate the corresponding link and display information linked to the link.

Hereinafter, the method of determining the coordinate value of the electronic pen 200 is described in detail according to exemplary embodiments of the present invention.

Figure 5A:
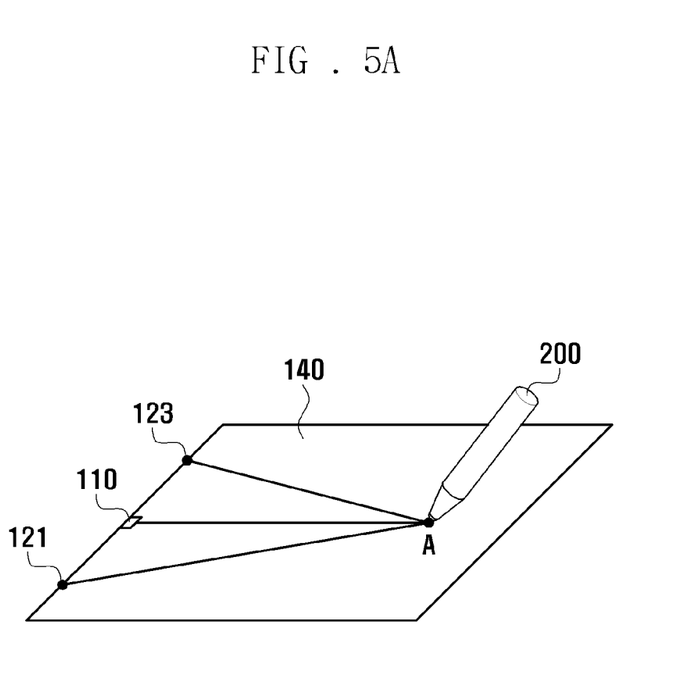
FIG. 5A and FIG. 5B are views explaining the calculation of a coordinate of the electronic pen according to exemplary embodiments of the present invention.
Figure 5B:
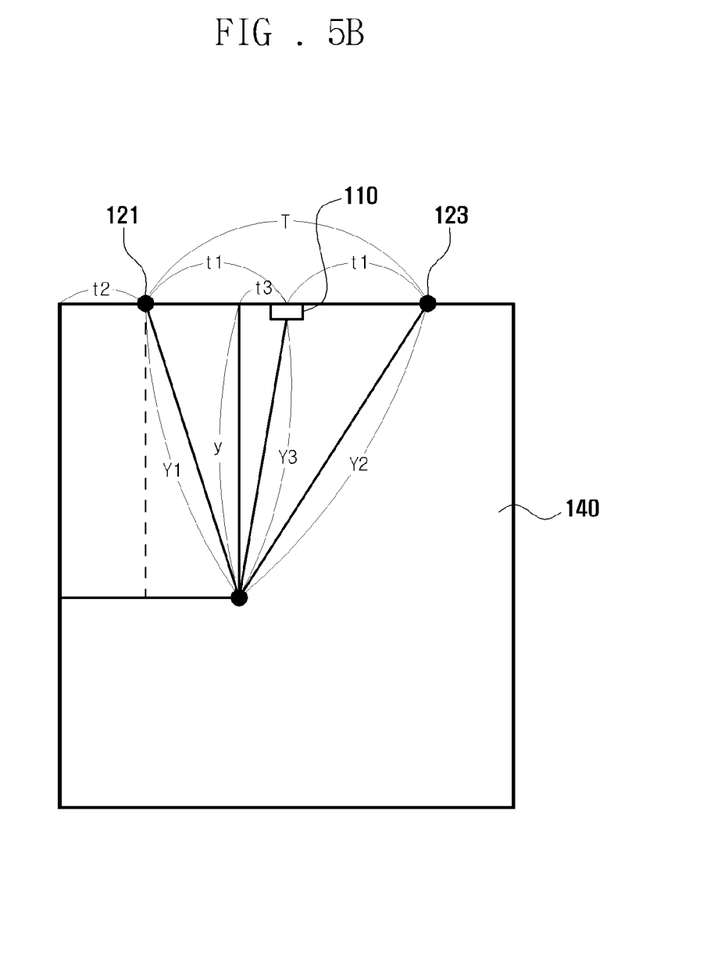

FIG. 5A and FIG. 5B are views explaining the determination of a coordinate of the electronic pen 200 when the folding angle is 0° or 180°. In FIG. 5B, 'Y1' may represent a distance between the first ultrasonic sensor 121 and the electronic pen 200; 'Y2' may represent a distance between the second ultrasonic sensor 123 and the electronic pen 200; 'Y3' may represent a distance between the infrared sensor unit 110 and the electronic pen 200; 't1' may represent a distance between the infrared sensor unit 110 and the first ultrasonic sensor 121 or the second ultrasonic sensor 123; 't2' may represent the shortest distance between the first ultrasonic sensor 121 and an end vertex of one edge of the display unit 140 along which the first ultrasonic sensor 121 is situated; 'y' may represent a straight distance between the electronic pen 200 and one side of the display unit 140 where the first ultrasonic sensor 121 is situated; and 't3' may represent a distance from the infrared sensor unit 110 to a point on the one edge of the display unit 140 at which the line 'y' intersects the one edge of the display unit 140 to form a perpendicular (i.e., straight) distance between the point and the electronic pen 200. 'T' may represent a distance between the first ultrasonic sensor 121 and the second ultrasonic sensor 123.

Referring to FIG. 5B, the controller 160 may obtain an area of a triangle consisting of the lines Y1, Y2, and T using Heron's formula, which is expressed in Equation 1:

$$S=\{s(s-Y1)(s-Y2)(s-T)\}^{1/2}, \text{ where } S \text{ represents the area and } s=(Y1+Y2+T)/2. \quad \text{[Equation 1]}$$

Once the area is obtained, the length of y can be calculated by dividing the area S by T. The values of Y1 and Y2 can be measured and provided by the first ultrasonic sensor 121 and the second ultrasonic sensor 123, respectively, and the value of T may be determined by a designer during a manufacturing process of the terminal 100. Since the area of a triangle may generally be obtained by a formula $S=y*T/2$, the value of y can be calculated using the area calculated through Equation 1.

The value of t3 may be obtained from a triangle consisting of the lines y, Y3, and t3. For example, the value of y can be calculated as described above and the value of Y3 can be obtained based on the infrared signal detected by the infrared sensor unit 110 from the electronic pen 200. Since the triangle consisting the lines y, Y3, and t3 is a right angled triangle, the value of t3 can be obtained through Pythagoras' theorem, which is expressed in Equation 2:

$$t3=\{(Y3)^2-y^2\}^{1/2} \quad \text{[Equation 2]}$$

When the value of t3 is obtained, the controller 160 can calculate the x coordinate of the electronic pen 200 by subtracting t3 from the distance (t2+t1). The x coordinate may be equivalent to a distance of the infrared sensor unit 110 from one edge of the display unit 140.

When the electronic pen 200 indicates a specific point "A" on the display unit 140, the controller 160 can compute the coordinate (x, y) of point "A" through the above described calculation method.

The above-described description relates to a method of computing the coordinate of the electronic pen 200 when the display unit 140 is completely opened (i.e., the folding angle of the display unit 140 is 0° or 180°). Hereinafter, a method of computing the coordinate of the electronic pen 200 when the display unit 140 is folded at a non-zero angle is described.

Figure 6A:
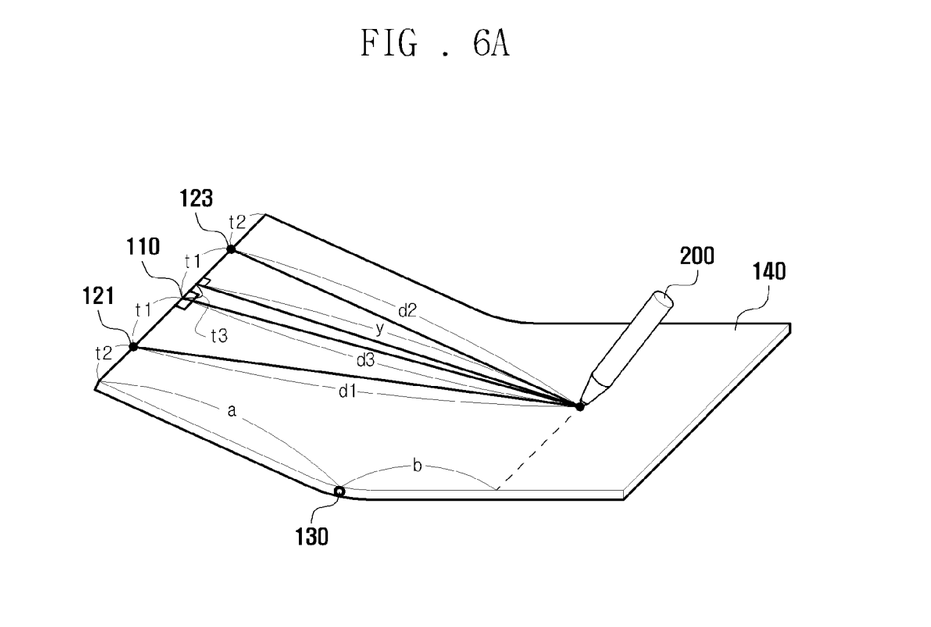
FIG. 6A and FIG. 6B are views explaining the calculation of a coordinate of the electronic pen when the display unit is folded according to exemplary embodiments of the present invention.
Figure 6B:
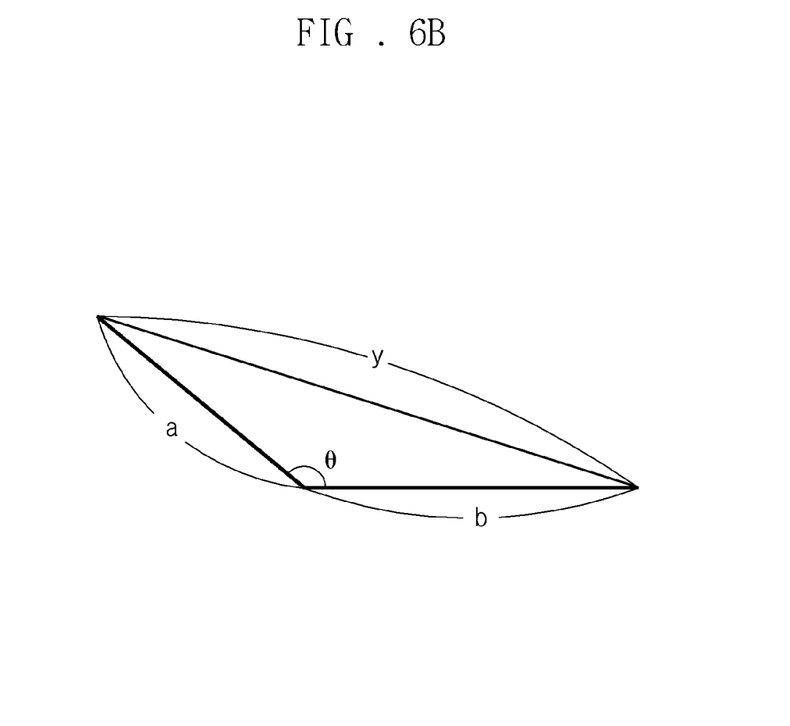

FIG. 6A and FIG. 6B are views explaining the calculation of a coordinate of the electronic pen 200 when the folding angle is greater than 0° and less than 180°. In FIG. 6A, 'd1' may represent a distance between the first ultrasonic sensor 121 and the electronic pen 200; 'd2' may represent a distance between the second ultrasonic sensor 123 and the electronic pen 200; 'd3' may represent a distance between the infrared sensor unit 110 and the electronic pen 200; 't1' may represent a distance between the infrared sensor unit 110 and the first ultrasonic sensor 121 or the second ultrasonic sensor 123; 't2' may represent the shortest distance between the first ultrasonic sensor 121 to an end vertex of one edge of the display unit 140 at which the first ultrasonic sensor 121 is positioned; 'y' may represent the straight distance between the electronic pen 200 and one side of the display unit 140 where the first ultrasonic sensor 121 is situated; and 't3' may represent a distance from the infrared sensor unit 110 to a point on the one edge of the display unit 140 at which the line 'y' intersects the one edge of the display unit 140 to form a perpendicular (i.e., straight) distance between the point and the electronic pen 200.

Referring to FIG. 6A and FIG. 6B, distances d1, d2, and d3 can be obtained from the first ultrasonic sensor 121, the second ultrasonic sensor 123, and the infrared sensor unit 110, respectively. When the value of the distances d1, d2, and d3 are obtained, the controller 160 can obtain the value of y through the equations described above with respect to FIG. 5A and FIG. 5B. When the value of y is obtained, the controller 160 can calculate the X-axis coordinate of the point "A" on the display unit 140 that is contacted by the electronic pen 200 according to the calculation method described above.

Then, the controller 160 may calculate the Y-axis coordinate point of the point "A" on the display unit 140. To calculate the Y-axis coordinate of the point "A," a triangle consisting of the line 'y,' line 'a,' and line 'b' as shown in FIG. 6B may be considered. The length of the line y may be obtained through the above-described calculation method. The length of the line 'a' may correspond to a distance from a hinge line of the display unit 140 to one side of the display unit 140, and may be determined by a designer during a manufacturing process of the terminal 100. Only the length of the line 'b' may need to be calculated. The controller 160 may calculate the length of the line 'b' by using Equation 3:

$$y^2=a^2+b^2-2ab \cos \theta. \quad \text{[Equation 3]}$$

The angle θ can be obtained by the angle sensor unit 130. Therefore, the length of the line 'b' can be obtained through the Equation 3.

Consequently, the coordinate of the electronic pen 200 may be obtained as (x, (a+b)). Based on the obtained coordinate of the electronic pen 200, the controller 160 can activate a function associated with a corresponding display map that is displayed on the display unit 140.

As described hereinabove, the terminal having the foldable display unit 140 can have an angle sensor unit 130 for sensing a folding angle, and may thereby accurately determine the Y-axis coordinate of a point selected by the electronic pen 200.

Figure 7:
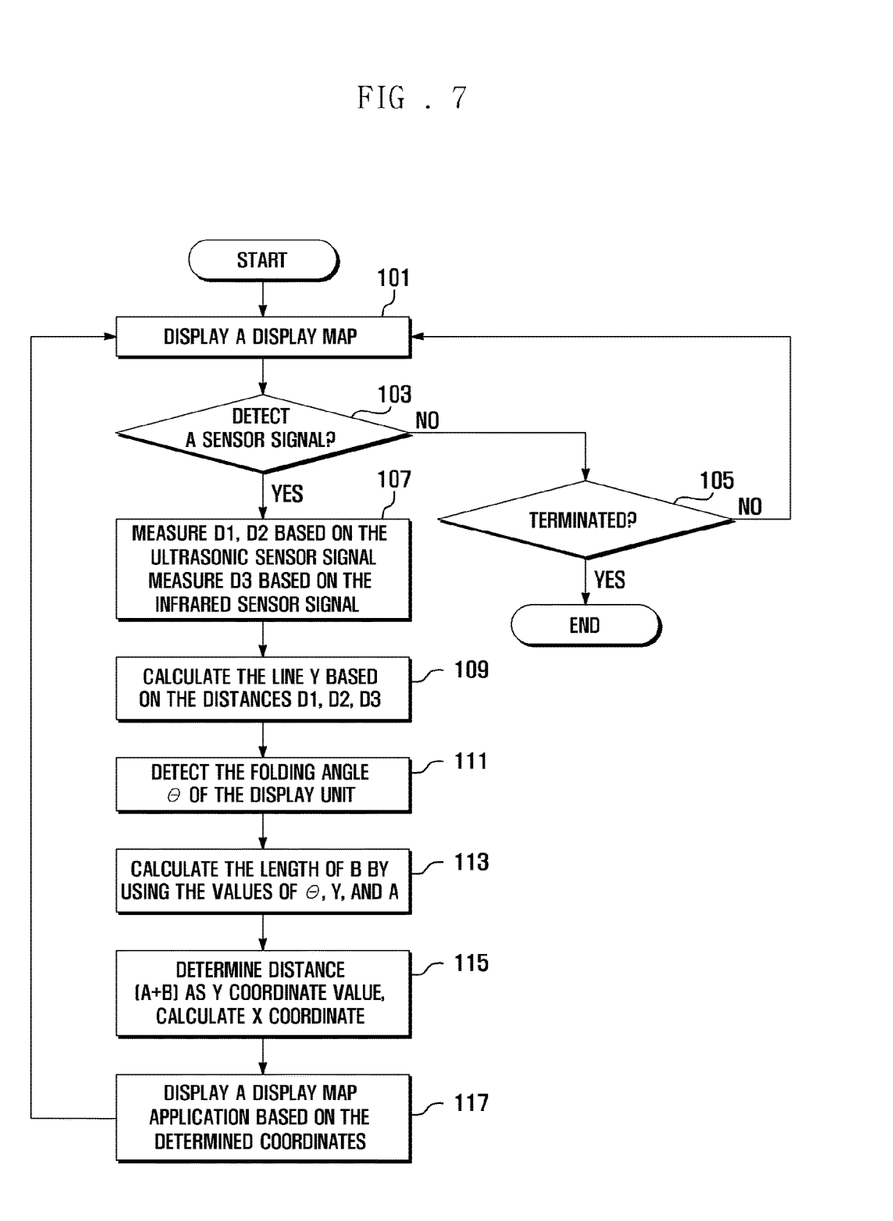
FIG. 7 is a flowchart illustrating a method of producing an input signal for the terminal having the foldable display unit according to exemplary embodiments of the present invention.

FIG. 7 is a flowchart illustrating an input method for a terminal having a foldable display unit according to exemplary embodiments of the present invention.

Referring to FIG. 7, the terminal 100 may instruct the display unit 140 to display a display map (i.e., at least one of a key map, a menu map, and a link map) stored in the storage unit 150 (101).

The terminal 100 may maintain the display map and the controller 160 may monitor the sensor units 110 and 120 to determine if the ultrasonic sensor unit 120 and the infrared sensor unit 110 detect a sensor signal (103). If the sensor units 110 and 120 fail to detect a sensor signal at step 103, the terminal 100 may check whether the input method/process is terminated (105). If the input method is not terminated and the terminal 100 maintains a current service (e.g., a service of generating an input signal based on the electronic pen 200), the process may return to step 101.

At step 103, if the ultrasonic sensor unit 120 and the infrared sensor unit 110 detect the sensor signals, the ultrasonic sensor unit 120 and the infrared sensor unit 110 may determine the distance (e.g., d1 and d2) based on the ultrasonic sensor signal, and the distance (e.g., d3) based on the infrared sensor signal (107). The ultrasonic sensor unit 120 may include the first ultrasonic sensor 121 and the second ultrasonic sensor 123 to measure the distances d1 and d2.

Then, the controller 160 may calculate the length of the line y based on the distances d1, d2, and d3 obtained at step 107 (109). The line y may indicate a straight distance between a point selected by the electronic pen 200 on the display unit 140 and one side of the display unit 140 at which the ultrasonic sensor unit 120 and infrared sensor unit 110 are positioned. The length of the line y can be calculated using Heron's formula, which is used to calculate the area of a triangle when the lengths of three sides are known, as described above.

The controller 160 may then receive the folding angle θ of the display unit 140 (111). That is, the angle sensor unit 130 can measure the folding angle of the display unit 140, and may subsequently transmit the folding angle to the controller 160.

The controller 160 can then calculate the length of line b as described above (113). For example, by using the law of cosines, the controller 160 can calculate the length of line b from the line y, the angle θ, and the line a.

The controller 160 may determine the distance of (a+b) on the display unit 140 (115). The distance of (a+b) may be equivalent to the Y-axis coordinate of the point selected by the electronic pen 200. In addition, based on the y value obtained at step 109, the controller 160 may determine the X-axis coordinate of the point selected by electronic pen 200.

After determining the X and Y coordinates of the point selected by electronic pen 200, the controller 160 may instruct the display unit 140 to display a display map application based on the determined coordinates (117). For example, when a key map is output to the display map on the display unit 140 and the electronic pen 200 selects a coordinate that corresponds to a specific number or character, the controller 160 can display the specific number or character on the display unit 140. If, for example, the display map is a menu map and the electronic pen 200 selects a specific menu, the controller 160 may activate a corresponding menu. If, for example, a display map is a link map and the electronic pen 200 selects a specific link, the controller 160 may instruct the display unit 140 to display corresponding linked information in a new window or in an overlay window. If the area designated for use of the electronic pen 200 does not include any specific key, menu or link, the controller 160 can be configured not to perform any function and to stay in a standby mode.

As described above, according to exemplary embodiments of the present invention, a point selected by an electronic pen can be accurately determined so that a function corresponding to the associated display map can be performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
   a foldable display configured to be folded along an arbitrary axis through a point on the foldable display, the arbitrary axis dividing the foldable display into a first display region folded relative to a second display region, each of the first display region and the second display region being configured to display content;
   a sensor configured to detect, in response to movement of the first display region about the arbitrary axis, a folding angle formed between the first display region and the second display region; and
   a controller configured to determine, in response to contact between an electronic pen and a surface of the second display region, coordinate information of the contact based on the folding angle.

2. A flexible display apparatus, comprising:
   a flexible display configured to be bent along an arbitrary axis passing through a point on the flexible display;
   a sensor configured to detect, in response to a bend of the flexible display along the arbitrary axis, a bending angle of the bend; and
   a controller configured to determine, based on the bending angle and a location of the arbitrary axis, coordinate information of a contact between an electronic pen and a surface of the flexible display, the coordinate information being defined in a coordinate system of the surface.

3. A method comprising:
   detecting, in response to a foldable display being folded along an arbitrary axis passing through a point on the foldable display, a folding angle formed between regions of the foldable display; and
   determining, in response to an electric pen touching a surface of the foldable display, a touch position of a contact point of the electronic pen with the surface based on the folding angle and a location of the arbitrary axis, the touch position lying within a plane of the surface.

4. The terminal of claim 1, wherein the controller is further configured to determine the coordinate information based on a location of the arbitrary axis.

5. The terminal of claim 1, wherein the controller is further configured to determine the coordinate information based on a distance between the contact and the arbitrary axis.

6. The terminal of claim 5, wherein the controller is further configured to determine the coordinate information based on a size of the first display region.

7. The terminal of claim 1, wherein the controller is further configured to determine the coordinate information based on information received from the electronic pen.

8. The terminal of claim 1, wherein the coordinate information locates the contact in a coordinate system of the foldable display in an un-folded state.

9. The flexible display of claim 2, wherein the controller is further configured to determine the coordinate information based on a distance between the contact and the arbitrary axis.

10. The flexible display of claim 9, wherein the controller is further configured to determine the coordinate information based on a distance between the arbitrary axis and a lateral side of the flexible display.

11. The flexible display of claim 2, wherein the controller is further configured to determine the coordinate information based on information received from the electronic pen.

12. The flexible display of claim 2, wherein the coordinate information locates the contact in a coordinate system of the flexible display in an un-folded state.

13. The method of claim 3, further comprising:
   determining the location of the arbitrary axis.

14. The method of claim 3, further comprising:
   determining a distance between the arbitrary axis and the contact point,
   wherein the touch position is further determined based on the distance.

15. The method of claim 3, further comprising:
   receiving a signal from the electronic pen,
   wherein the touch position is further determined based on the received signal.

16. The method of claim 3, wherein the touch position locates the contact point in a coordinate system of the foldable display in an un-folded state.

\* \* \* \* \*